Figure 1:
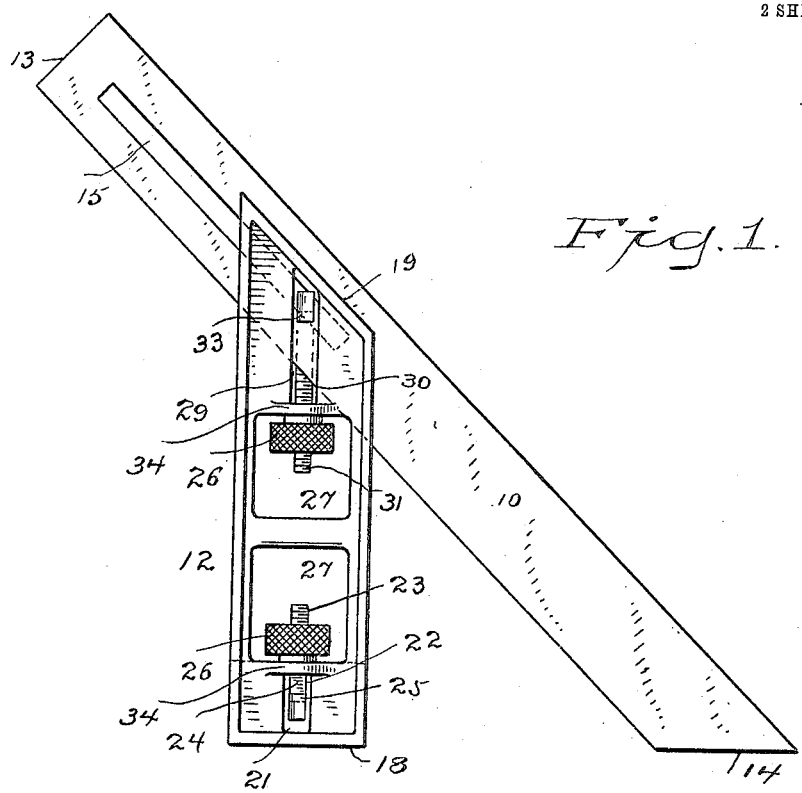

No. 821,092. PATENTED MAY 22, 1906.
P. L. FOX.
ADJUSTABLE AND SEPARABLE SQUARE AND MITER.
APPLICATION FILED NOV. 24, 1905.

2 SHEETS—SHEET 1.

WITNESSES
H. A. Lamb.
Edith L. Grant.

INVENTOR
Philo L. Fox
BY
A. W. Wooster
ATTORNEY

No. 821,092. PATENTED MAY 22, 1906.
P. L. FOX.
ADJUSTABLE AND SEPARABLE SQUARE AND MITER.
APPLICATION FILED NOV. 24, 1905.

2 SHEETS—SHEET 2.

WITNESSES
H. A. Lamb.
Edith L. Grant.

INVENTOR
Philo L. Fox

BY
A. M. Wooster
ATTORNEY

UNITED STATES PATENT OFFICE.

PHILO L. FOX, OF BRIDGEPORT, CONNECTICUT.

ADJUSTABLE AND SEPARABLE SQUARE AND MITER.

No. 821,092.

Specification of Letters Patent.

Patented May 22, 1906.

Application filed November 24, 1905. Serial No. 288,922.

*To all whom it may concern:*

Be it known that I, PHILO L. FOX, a citizen of the United States, residing at Bridgeport, county of Fairfield, State of Connecticut, have invented a new and useful Adjustable and Separable Square and Miter, of which the following is a specification.

This invention has for its object to provide a simple and inexpensive implement comprising, essentially, a sliding blade and a detachable handle, in connection with which I may or may not use a miter-blade and which shall combine all the functions of an ordinary steel square—that is, use as an inside square, an outside square, &c., with those of a miter—and shall be adapted to be taken apart and packed in the smallest possible compass for shipment or to be carried about in a tool-box, as it requires very much less space than any implement of its class now upon the market.

With these and other objects in view I have devised the novel, adjustable, and separable square and miter which I will now describe, referring to the accompanying drawings, forming a part of this specification, and using reference characters to indicate the several parts.

Figure 2:
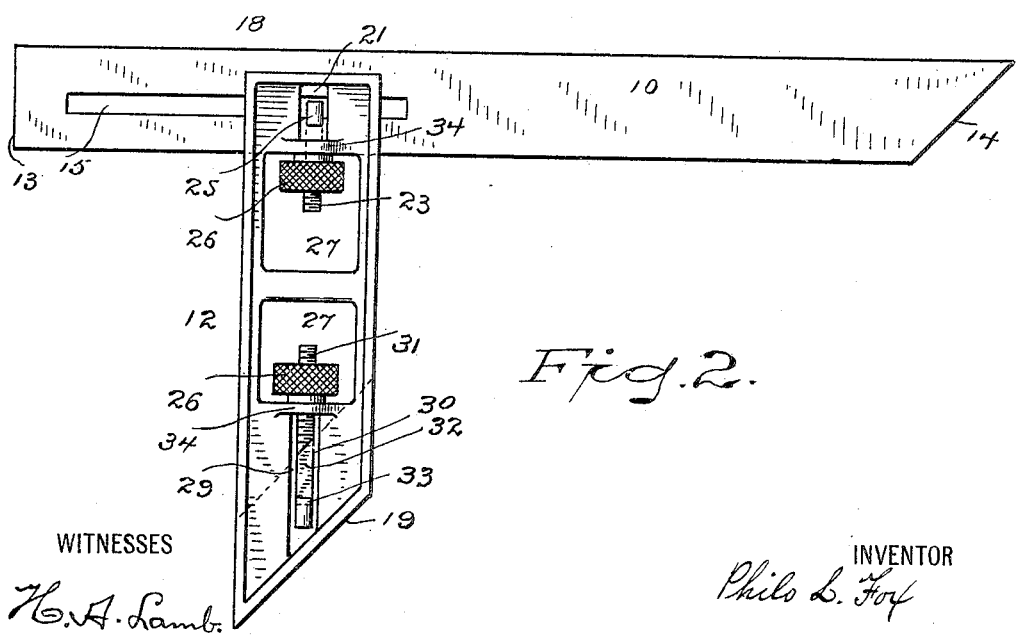
Figure 3:
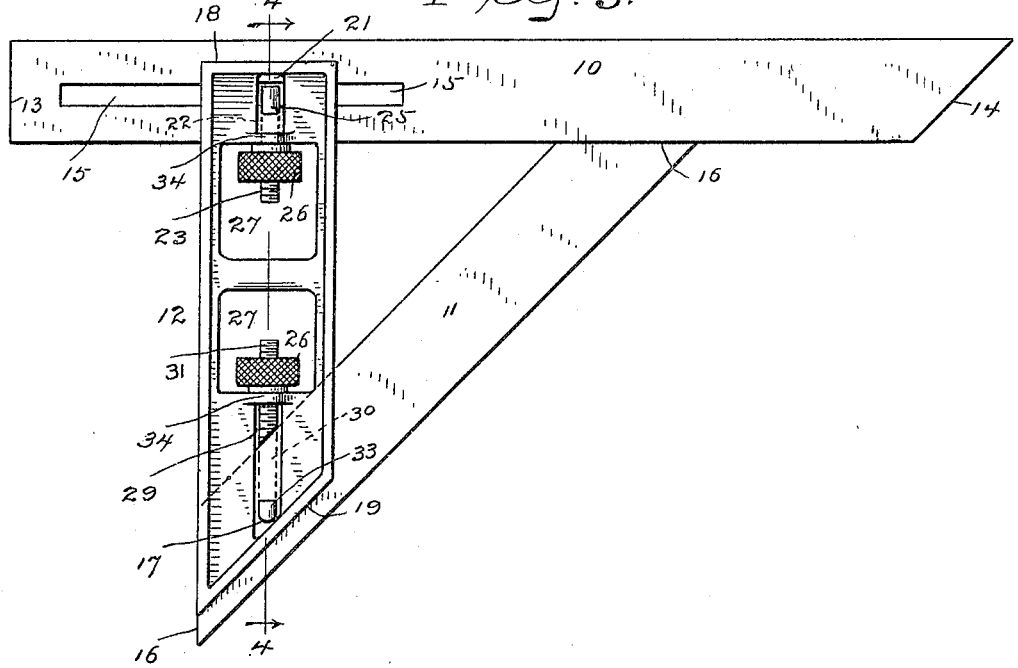
Figure 4:
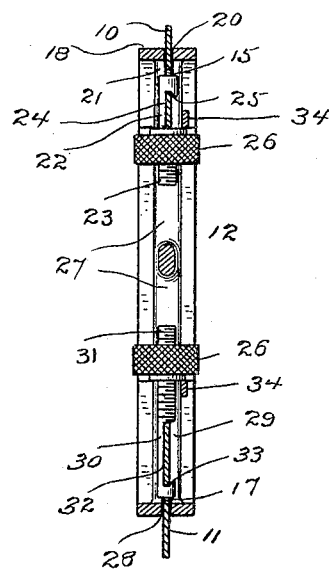

Figure 1 is an elevation illustrating a use of my novel implement in which the sliding blade only is used and the implement is used as a miter; Fig. 2, an elevation illustrating another use of the implement in which the sliding blade only is used and the implement is used as a square; Fig. 3, an elevation illustrating a use of the implement with both the sliding blade and the miter-blade, the implement being adapted for use either as an outside square or as a miter; and Fig. 4 is a section on the line 4 4 in Fig. 3 looking in the direction of the arrow.

My novel square and miter comprises two essential parts—to wit, an adjustable and removable sliding blade (indicated by 10) and a detachable handle, (indicated by 12,) in connection with which a miter-blade (indicated by 11) may or may not be used. The face of one end of the sliding blade is square—that is, at right angles to the sides, as at 13—and the other end is a miter, as at 14. Near the square end of the sliding blade is a longitudinal slot 15, the purpose of which will presently be explained. Both ends of the miter-blade are miters, as at 16—that is to say, the faces of the ends of the miter-blade lie at an angle of forty-five degrees to a line crossing the blade at right angles to the sides. Near one end of the miter-blade is a hole 17, the purpose of which will presently be explained, and, as shown, said blade is of such length as to cause one of its miter or oblique ends to contact with the inner edge of the sliding blade. The handle is square at one end, as at 18, and is a miter at the other end, as at 19. At the square end of the handle is a transverse slot 20, lying in the direction of its width, which receives the sliding blade. Lying in a slot 21, longitudinal to the handle and intersecting the transverse slot, is a locking-rod 22, threaded at its inner end, as at 23, cut away on one side, as at 24, to receive the portion of the sliding blade at one side of the slot, and having at its other end an undercut head 25, which is adapted to pass through slot 15 in the sliding blade, the undercut face of the head being adapted to engage the wall of the slot.

26 indicates a knurled nut on the rod, which lies in a recess 27 in the handle and which when tightened up against the wall of the recess draws the sliding blade tightly against the base of slot 20 in the handle and locks said blade securely in place. At the miter end of the handle is a slot 28, lying obliquely in the direction of its width, which receives the miter-blade. Lying in a slot 29, longitudinal to the handle and intersecting slot 21, is a locking-rod 30, threaded at its inner end, as at 31, cut away on one side, as at 32, to receive the portion of the miter-blade at one side of hole 17, and having at its other end an undercut head 33, which is adapted to pass through the hole in the miter-blade or the slot in the sliding blade, the undercut face of the head being adapted to engage the wall of the hole or the slot. Another knurled nut 26, lying in a recess 27 in the handle, engages the rod and when tightened up against the wall of the recess draws the miter-blade tightly against the base of slot 28 in the handle and locks said blade securely in place.

34 indicates bridge-pieces across slots 21 and 29.

The operation is as follows: When it is required to use the implement as a miter only, it is not necessary to use the miter-blade at all, the desired result being obtained by placing the sliding blade in oblique slot 28 at the miter end of the handle and locking it there by placing head 33 of locking-rod 30 in engagement with the slot in the blade and tightening up the nut, as clearly shown in Fig. 1. When the implement is to be used as a square only, the sliding blade is placed in slot 20 at the square end of the handle and is locked there by placing head 25 of locking-rod 22 in engagement with the slot in the sliding blade and locking the blade in position by tightening up the nut on the rod. When the miter-blade is used, it is held in place by locking-rod 30, the hole 17 in said blade being engaged by head 33 and the blade locked in place by tightening up the nut. When either of the locking-nuts is turned backward on the rod sufficiently to loosen it, the undercut head thereon may be moved backward out of the slot or hole, as may be, which will leave the blade free, so that it may be removed. When it is simply required to adjust the sliding blade, the nut is only turned backward on the rod sufficiently to loosen the blade, so that it may be moved longitudinally in either slot 20 or 28, as may be. This permits the blade to be moved longitudinally in the slot in either direction. Having given to the blade the desired adjustment, it is locked in place again by tightening up the nut. When the square end 13 of the sliding blade is in alinement with the long side of the handle, the implement is adapted for use as an inside square, and when the sliding blade is passed outward beyond the long end of the handle, as in Figs. 2 and 3, the implement may be used as an outside square and is adapted for any of the uses of an ordinary steel square. When the miter end 14 of the sliding blade is placed in alinement with the long side of the miter-blade, the effect is simply to extend the miter, leaving the opposite side of the implement adapted for use as an outside square or for any of the various uses to which an ordinary steel square may be placed, except use as an inside square. For the latter use square end 13 of the sliding blade would be placed in alinement with the long side of the handle, as already described. There will be, however, whenever both blades are used a complete triangle formed by the sliding and miter blades and the handle regardless of the adjusted position of the sliding blade. The required acute angles are formed by the meeting points of the inner edges of these members, and when the sliding blade is moved to a position where its miter or oblique end is brought into alinement with the outer edge of the miter-blade the outer edges of the sliding and miter blades with the edge of the handle form practically a complete triangle of larger size, and when, as shown in Fig. 3, the sliding blade extends beyond the outer edge of the miter-blade the counterpart obtuse angle is formed by the outer edge of the miter-blade and the inner edge of the sliding blade.

Having thus described my invention, I claim—

1. An adjustable and separable square and miter comprising sliding and miter blades, a handle having in one end in the direction of its width a transverse slot adapted to receive the sliding blade and in the other end an oblique slot adapted to receive the miter-blade, said sliding and miter blades being respectively adjustable and non-adjustable, the miter-blade having an oblique end and being of a length to contact with the inner edge of the sliding blade, said blades and handle forming a complete triangle, and means for detachably securing said blades to the handle.

2. A square and miter comprising a handle having in one end in the direction of its width a transverse slot 20 and a slot 21 longitudinal to the handle, at the other end an oblique slot 28 and a slot 29 longitudinal to the handle, a sliding blade in slot 20 provided with a slot 15, a miter-blade in slot 28 provided with a hole 17, the miter-blade having an oblique end and being of a length to contact with the inner edge of the sliding blade, said blades and handle forming a complete triangle, locking-rods in slots 21 and 29 provided with undercut heads which engage respectively said slot and hole and nuts on said rods by which the blades are detachably secured to the handle.

3. A square and miter comprising a handle having in one end in the direction of its width a slot 20 and a slot 21 longitudinal to the handle, at the other end an oblique slot 28 and a slot 29 longitudinal to the handle and recesses 27, a sliding blade in slot 20 provided with a slot 15, a miter-blade in slot 28 provided with a hole 17, the miter-blade having an oblique end and being of a length to contact with the inner edge of the sliding blade, said blades and handle forming a complete triangle, locking-rods in slots 21 and 29 having heads adapted to engage said slot and hole respectively and nuts on said rods lying in recesses 27 by which the blades are secured to the handle.

4. A square and miter comprising a handle having in one end in the direction of its width a slot 20 and a slot 21 longitudinal to the handle, at the other end an oblique slot 28 and a slot 29 longitudinal to the handle, a sliding blade in slot 20 provided with a slot 15, a miter-blade in slot 28 provided with a hole 17, the miter-blade having an oblique end and being of a length to contact with the inner edge of the sliding blade, said blades and handle forming a complete triangle, locking-rods in slots 21 and 29 cut away on one side to receive the blades and having undercut heads adapted to engage the slot and hole respectively and nuts on said rods by which the blades are secured to the handle.

In testimony whereof I affix my signature in presence of two witnesses.

PHILO L. FOX.

Witnesses:
 A. M. WOOSTER,
 S. W. ATHERTON.